United States Patent [19]

Lu

[11] Patent Number: 4,847,027

[45] Date of Patent: Jul. 11, 1989

[54] INFUSIBLE PRECERAMIC POLYMERS VIA NITRIC OXIDE TREATMENT

[75] Inventor: Paul P. Lu, Midland, Mich.

[73] Assignee: Dow Corning Corporation, Midland, Mich.

[21] Appl. No.: 69,565

[22] Filed: Jul. 6, 1987

[51] Int. Cl.$^4$ .............................................. C04B 33/30
[52] U.S. Cl. ...................................... 264/65; 264/66; 264/82
[58] Field of Search .............................. 264/82, 65, 66

[56] References Cited

U.S. PATENT DOCUMENTS

| | | | |
|---|---|---|---|
| 3,853,567 | 12/1974 | Verbeek | 264/65 |
| 4,052,430 | 10/1977 | Yajima et al. | |
| 4,100,233 | 7/1978 | Yajima et al. | |
| 4,220,600 | 9/1980 | Yajima et al. | |
| 4,283,376 | 8/1981 | Yajima et al. | |
| 4,312,970 | 1/1982 | Gaul | |
| 4,340,619 | 7/1982 | Gaul, Jr. | |
| 4,342,712 | 8/1982 | Yajima et al. | |
| 4,377,677 | 3/1983 | Iwai et al. | |
| 4,399,232 | 8/1983 | Yajima et al. | |
| 4,414,403 | 11/1983 | Schilling et al. | |
| 4,540,803 | 9/1985 | Cannady | |

FOREIGN PATENT DOCUMENTS 2236078 7/1972 Fed. Rep. of Germany.

OTHER PUBLICATIONS

Ichikawa et al.; "Effect of Curing Conditions on Mechanical Properties of SiC Fibre" (Nicalon): Journal of Materials Science Letters, 6 (1987), 420–422.

*Primary Examiner*—James Derrington
*Attorney, Agent, or Firm*—James E. Bittell

[57] ABSTRACT

A method is disclosed for the preparation of ceramic materials or articles by the pyrolysis of preceramic polymers wherein the preceramic polymers are rendered infusible prior to pyrolysis by exposure to gaseous nitric oxide. Ceramic materials with low oxygen content, excellent physical properties, and good thermal stability can be obtained by the practice of this invention. This method is especially suited for the preparation of ceramic fibers.

18 Claims, No Drawings

INFUSIBLE PRECERAMIC POLYMERS VIA NITRIC OXIDE TREATMENT

BACKGROUND OF INVENTION

This invention relates to the preparation of ceramic materials or articles by the pyrolysis of preceramic polymers wherein the preceramic polymers are rendered infusible prior to pyrolysis by exposure to gaseous nitric oxide. This method is especially suited for the preparation of ceramic fibers. Ceramic fibers prepared by the method of this invention have relatively low oxygen content. Such ceramic fibers with low oxygen content possess good thermal stability at temperatures up to about 1600° C.

Ceramic materials have been prepared by the pyrolysis of various preceramic polymers in the prior art. Gaul in U.S. Pat. No. 4,312,970 (issued Jan. 26, 1982) obtained ceramic materials by the pyrolysis of preceramic silazane polymers prepared by reacting organochlorosilanes and disilazanes. The preceramic silazane polymers were pyrolyzed in an inert atmosphere without any separate treatment to render the silazane preceramic polymer infusible.

Gaul in U.S. Pat. No. 4,340,619 (issued July 20, 1982) obtained ceramic materials by the pyrolysis of preceramic silazane polymers prepared by reacting chlorine-containing disilanes and disilazanes. Fibers prepared from such preceramic silazane polymers were given a "mild heat treatment" in air before pyrolysis but there is not teaching that such a treatment rendered the fibers infusible.

Cannady in U.S. Pat. No. 4,540,803 (issued Sept. 10, 1985) obtained ceramic materials by the pyrolysis of preceramic silazane polymers prepared by reacting trichlorosilane and disilazane. The preceramic silazane polymers were not rendered infusible prior to pyrolysis to form ceramic materials.

Bartos et al. in U.S. patent application Ser. No. 748,109, filed Jun. 24, 1985, obtained infusible preceramic silazane polymers by treatment of the preceramic silazane polymer with a steam or a steam and oxygen mixture.

Lipowitz, in U.S. patent application Ser. No. 926,168, filed Nov. 3, 1986, obtained infusible preceramic polymer by treatment of the preceramic polymer with a plasma energy source. Both vinyl-containing and vinyl-free preceramic polymers were rendered infusible by plasma treatment. High energy electrons interact with neutral gas molecules in the plasma thereby forming unique species such as metastable species, atoms, radicals, and ions. Theses unique species then interact with the preceramic polymer thereby rendering the preceramic polymer infusible.

Lutz et al., in U.S. patent application Ser. No. 905,020, filed Sept. 8, 1986, obtained infusible preceramic polymer compositions by treatment of the compositions with UV irradiation wherein the compositions contained vinyl- or allyl-containing preceramic polymers, mercapto compounds, and photoinitiators.

Bujalski et al., in copending U.S. Patent Applications entitled "A Method of Producing Silicon Carbide Preceramic Vinyl-containing Polymers" and "An Improved Method of Producing Silicon Carbide Preceramic Vinyl-containing Polymers," obtained infusible preceramic polymers by thermal treatment of vinyl-containing polysilanes or by UV irradiation of vinyl-containing polysilanes.

Yajima et al. in U.S. Pat. Nos. 4,220,600 (issued Sept. 2, 1980), 4,283,376 (issued Aug. 11, 1981), 4,342,712 (issued Aug. 3, 1982), and 4,399,232 (issued Aug. 16, 1983) disclosed the use of gamma ray or electron beam irradiation to cure preceramic modified polycarbosilane fibers prior to pyrolysis. Unmodified polycarbosilane is a polymer having a skeletal structure composed substantially of recurring carbosilane units of the formula

The modified polycarbosilane of U.S. Pat. Nos. 4,220,600 and 4,283,376 are composed mainly of the structural units

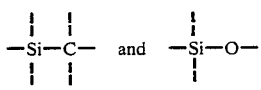

but which also contains some boron in the skeletal polymer chain. The modified polycarbosilanes of U.S. Pat. Nos. 4,342,712 and 4,399,232 are block copolymers composed mainly of carbosilane units with titanoxane units of the formula —(—Ti—O—)—.

What has been newly discovered is a method of rendering preceramic polymers infusible prior to pyrolysis by treatment of the preceramic polymers with gaseous nitric oxide. This method represents a significant advance in the art of preparing ceramic materials or articles, especially in the art of preparing ceramic fibers.

THE INVENTION

This invention relates to a method of rendering a preceramic polymer infusible prior to pyrolysis, which method comprises treating the preceramic polymer with gaseous nitric oxide for a time sufficient to render the preceramic polymer infusible.

This invention also relates to a method of preparing a silicon carbide-containing ceramic article, said method comprising (A) forming an article of the desired shape from a preceramic polycarbosilane; (B) curing the article formed in step (A) by heating the formed article under a nitric oxide-containing atmosphere to about 200° C. at a rate sufficiently slow so that the formed article will not melt or fuse during pyrolysis step (C); and (C) heating the cured article of step (B) in an inert atmosphere or in a vacuum to an elevated temperature greater than 800° C. until the preceramic polymer is converted to silicon carbide-containing ceramic article.

This invention also relates to a method of preparing a silicon nitride-containing ceramic article, said method comprising (A) forming an article of the desired shape from a preceramic polymer selected from the group consisting of polysilazanes and hydridopolysilazanes; (B) curing the article formed in step (A) by heating the formed article under a nitric oxide-containing atmosphere to about 200° C. at a rate sufficiently slow so that the formed article will not melt or fuse during pyrolysis step (C); and (C) heating the cured article of step (B) in an inert atmosphere or in a vacuum to an elevated temperature greater than 800° C. until the preceramic polymer is converted to silicon nitride-containing ceramic article.

Treatment of the preceramic polymer compositions of the present invention with gaseous nitric oxide will result in an infusible preceramic polymer material suitable for pyrolysis to form a ceramic material. Preceramic polymer compositions in the form of pellets, powders, flakes, foams, fibers, and the like are especially suitable for treatment with gaseous nitric oxide by the method of this invention. Preceramic polymer compositions in the form of fibers are especially preferred in the practice of this invention.

The temperature of treatment of the preceramic polymers with nitric oxide should be sufficiently low so that the preceramic polymer composition does not melt or fuse during the treatment step. Preferably the treatment temperature is between room temperature and the softening temperature of the preceramic polymer. More preferably the treatment temperature should be between room temperature and about 10° C. below the softening temperature of the preceramic polymer. As the preceramic polymer cures the softening temperature will increase; therefore temperatures greater than the initial softening temperature may be used in the later part of the nitric oxide treatment step. When curing fibers with nitric oxide it is generally preferred that the temperature is increased slowly from ambient to about 200° C. while the fiber is exposed to the reactive gas in order to obtain fibers of maximum strength. Normally rates of about 5° to 10° C./hr will yield fibers of maximum strength. The temperature may be increased at faster rates if desired. The optimum temperature rate may depend on the shape and size of the shaped article; for a given shaped article the optimum temperature rate may be determined experimentally.

The preceramic polymers are treated with nitric oxide for a time sufficient to render the preceramic polymer infusible. What is meant by "infusible" in this specification is that the nitric oxide treated preceramic polymer, when heated rapidly up to the pyrolysis temperature, will not fuse together. A crude screen for infusibility is provided by the solubility of the preceramic polymer in toluene. Prior to any curing treatment the preceramic polymers of this invention are completely or almost completely soluble in toluene. The infusible preceramic polymer compositions obtained by the method of this invention are generally either insoluble in toluene or have only limited solubility in toluene. The time required to render the preceramic polymer composition infusible by the method of this invention will depend, in part, on the size of the preceramic polymer article, the temperature of the nitric oxide treatment, the concentration of nitric oxide to which the composition is exposed, and the specific preceramic polymer employed. The optimum treatment time can be determined by routine experimentation. For fibers a treatment time of 2 to 24 hours is generally sufficient.

When the preceramic polymer is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

When the preceramic polymer is in the shape of a formed object such as a fiber it is generally preferred that the fiber be under tension during the actual curing step. The amount of tension usually employed is that sufficient to keep the fibers from kinking during the cure step. Ceramic fibers cured under tension generally exhibit higher tensile strength relative to fibers prepared without tension.

The preceramic polymer may be exposed to either neat gaseous nitric oxide or gaseous nitric oxide in an inert gas such as nitrogen, argon, and the like. Exposure to a nitric oxide/inert gas mixture containing about 4–10 volume percent nitric oxide is generally preferred. In the case of preceramic polymer fibers, the nitric oxide treatment may be carried out using a continuous, "on-line" method as the fibers are formed or a batch treatment where an entire fiber spool may be treated. Batch treatment is generally preferred as it allow for longer contact times and easier temperature control. Other methods of treatment as well as combinations of treatment methods may be employed.

The preceramic polymers suitable for this invention must be capable, after being cured by exposure to nitric oxide, of being converted to a ceramic material by pyrolysis at elevated temperatures. It is generally preferred that the preceramic polymer compositions used in this invention be capable of being converted to ceramic materials in at least 40 weight percent yield. Mixtures of preceramic polymers may also be used in this invention.

The preceramic polymers suitable for use in this invention are generally well known in the art. Examples of such preceramic polymers include polycarbosilanes, polysilazanes, and hydridopolysilazanes. Generally the polycarbosilanes are preferred.

Preceramic polycarbosilanes suitable for use in this invention contain Si and C as the main skeleton elements in the form of $(SiCH_2)$ units. The polycarbosilanes useful in this invention may also contain oxygen as a skeleton element in addition to Si and C as the main skeleton elements. Oxygen may be inadvertently introduced during preparation or handling or may be incorporated into the polycarbosilane by design. It is preferred that the amount of oxygen present is less than about 10 weight percent, more preferably less than about 5 weight percent, and most preferably less than 1 weight percent. Other elements may also be present as main skeleton elements in addition to Si, C, and O. However, these other elements should be present at less than about 1 weight percent and preferably only be present at trace levels (i.e. less than 0.1 weight percent).

Suitable polycarbosilanes may be prepared by methods well known in the art. For example, suitable polycarbosilanes may be prepared from monosilanes by pyrolysis at 400° to 1200° C. as described by Verbeck et al. in German OLS No. 2,236,078.7. Suitable polycarbosilanes may also be prepared from polysilanes by heating and polycondensing the polysilanes at 300° to 2000° C. under an inert atmosphere or vacuum as described by Yajima et al. in U.S. Pat. Nos. 4,052,430 and 4,100,233. Other suitable polycarbosilanes may be prepared by heating a mixture of polysilanes with about 0.01 to 15 weight percent of a phenylborosiloxane under an inert atmosphere as described in Yajima et al. in U.S. Pat. Nos. 4,220,600 and 4,283,376. Suitable polycarbosilanes may also be prepared by the method of Iwai et al.

U.S. Pat. No. 4,377,677 wherein an improved procedure for preparing polycarbosilanes from polysilanes is disclosed. The branched polycarbosilanes of Schilling (U.S. Pat. No. 4,414,403) are also suitable for use in this present invention. Other polycarbosilanes capable of being converted to ceramic material by pyrolysis at elevated temperatures under an inert atmosphere or vacuum are also useful in the present invention. The patents listed in this paragraph are hereby incorporated by reference.

Preferred polycarbosilanes for the practice of this invention are prepared from the thermal polycondensation of polysilanes as described in U.S. Pat. Nos. 4,052,430 and 4,100,233.

More preferred polycarbosilanes are prepared by thermally decomposing and polycondensing a polysilane or polysilanes by heating said polysilane or polysilanes at a temperature of 300°–2000° C. in an inert gas, hydrogen, or vacuum wherein said polysilane or polysilanes are selected from the group consisting of cyclic polysilanes of the general formula

$(R^1R^2Si)_n$ and linear polysilanes of the general formula

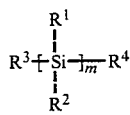

$$R^3 {\left[ \begin{matrix} R^1 \\ | \\ Si \\ | \\ R^2 \end{matrix} \right]}_m R^4$$

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, —Si($R^5$)$_3$ groups where $R^5$ is a alkyl group containing 1 to 4 carbon atoms, and halogen atoms. Examples of $R^1$, $R^2$, $R^3$, and $R^4$ as alkyl groups and $R^5$ include methyl, ethyl, propyl, and butyl groups. Examples of $R^1$, $R^2$, $R^3$, and $R^4$ as halogens include chlorine and bromine with chlorine being preferred. The most preferred polycarbosilanes are prepared by the thermal decomposition and polycondensation of dodecamethylcyclohexasilane or polydimethylsilane.

One especially preferred polycarbosilane can be obtained commercially from Nippon Carbon Co., Ltd., 2-6-1, Hachi-Chobari, Chuo-Ku, Tokyo 104, Japan or Dow Corning Corporation, Midland, Michigan.

The actual method of preparing the polycarbosilanes for use in the invention is not critical. The polycarbosilanes should contain Si, C, and, optionally, O as the main skeleton elements and should be capable of being converted to silicon carbide-containing ceramics upon pyrolysis to elevated temperatures in an inert atmosphere or vacuum. Preferably the polycarbosilanes used in the practice of this invention have a softening point of about 50° to 300° C. and most preferably in the range of 70° to 200° C.

Preceramic polysilazanes suitable for use in the present invention are R₃SiNH-containing silazane polymers. R₃SiNH-containing silazane polymers especially useful in this invention are described by Gaul in U.S. Pat. Nos. 4,312,970 (issued Jan. 26, 1982) and 4,340,619 (issued July 20, 1982). An especially preferred polysilazane is hydridopolysilazane described by Cannady in U.S. Pat. No. 4,450,803 (issued Sept. 10, 1985). Details of the procedures for preparing these polysilazanes may be found in the just named patents which are hereby incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula

$R'''_n SiCl_{(4-n)}$ with a disilazane having the general formula

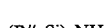

$(R''_3Si)_2NH$ at a temperature in the range of 25° to 300° C. while distilling by-produced volatile products, wherein R''' is a vinyl group, an alkyl group of 1–3 carbon atoms, or a phenyl group; R'' is a hydrogen atom, a vinyl group, an alkyl group of 1–3 carbon atoms, or a phenyl group; and n has a value of 1 or 2.

The silazane polymers of U.S. Pat. No. 4,340,619 are prepared by contacting and reacting in an inert, essentially anhydrous, atmosphere, a chlorine-containing disilane or a mixture of chlorine-containing disilanes, of the general formula $(Cl_bR'''_cSi)_2$ with a disilazane having the general formula

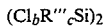

$(R''_3Si)_2NH$ at a temperature in the range of 25° to 300° C. while distilling by-produced volatile products, wherein R''' is a vinyl group, an alkyl group of 1–3 carbon atoms, or a phenyl group; R'' is a hydrogen atom, a vinyl group, an alkyl group of 1–3 carbon atoms, or phenyl group; b has a value of 0.5–3; c has a value of 0–2.5; and the sum of (b+c) is equal to three.

The hydridosilazane polymers of U.S. Pat. No. 4,450,803, which are the preferred silazane polymers for use in this invention, are prepared by contacting and reacting in an inert, essentially anhydrous atmosphere, trichlorosilane with a disilazane at a temperature in the range of 25° to 300° C. while removing by-produced volatile products, wherein said disilazane has the general formula

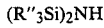

$(R''_3Si)_2NH$ where R'' is selected from the group consisting of vinyl, hydrogen, phenyl, and alkyl radicals containing 1 to 3 carbon atoms.

After the preceramic polymer composition has been rendered infusible by treatment with nitric oxide, the infusible preceramic polymer composition is fired to an elevated temperature of at least 750° C. in an inert atmosphere or vacuum until the mixture is converted to a ceramic material. Preferably the pyrolysis temperature is from about 1000° to about 1600° C. Since the preceramic polymer compositions of this invention have been rendered infusible prior to pyrolysis, the pyrolysis step may be carried out by quickly raising the temperature to the desired level. If the preceramic polymer composition is of sufficient viscosity or if it possesses a sufficiently low melt temperature, it can be shaped first, then rendered infusible, and then finally pyrolyzed to give a ceramic shaped article such as a fiber. Preferably the preceramic polymers used in the practice of this invention have a softening temperature of about 50° to 300° C. and most preferably in the range of 70° to 200° C. Such a softening temperature allows for the formation of preceramic fibers by known spinning techniques.

So that those skilled in the art can better appreciate and understand the invention, the following examples are given. Unless otherwise indicated, all percentages are by weight.

In the following examples, the analytical methods used were as follows:

The softening temperature was determined under a nitrogen atmosphere on a Thermomechanical Analyzer, Model 940, from Dupont Instruments.

Carbon, hydrogen, and nitrogen were determined on a C, H, N Elemental Analyzer, Model 240-XA, manufactured by Control Equipment Corp. of Lowell, Massachusetts. The sample was combusted at 1050° C. and then passed over a bed containing silver tungstate and a copper bed at 600° C. The $N_2$, $CO_2$, and $H_2O$ produced were then separated and detected using a thermal conductivity detector.

Oxygen was determined using a Leco Oxygen Analyzer equipped with an Oxygen Determinater 316 (Model 783700) and an Electrode Furnace EF100 (Model 77600) manufactured by Leco Corporation, St. Joseph, Michigan. The method includes the high temperature carbothermic reduction to CO with CO analysis by IR.

The preceramic polymers were fired to elevated temperature using a Lindberg furnace (Models 54434 or 54879).

Volume resistivities were determined on a Model 617 Programable Electronmeter from Keithley Corp. of Cleveland, Ohio. Dielectric constants and loss factors were determined with a Model 8510 Network Analyzer equipped with a resonance cavity from Hewlett-Packard of Palo Alto, Calif.

The physical properties of the ceramic fibers were determined using a Instron Testing Machine Model 1122 from Instron Corporation of Canton, Mass.

Unless otherwise indicated, the preceramic polymer used was a polycarbosilane obtained from Nippon Carbon Co., Ltd., 2-6-1, Hachi-Chobari, Chuo-Ku, Tokyo 104, Japan and is thought to be prepared by the method described in U.S. Pat. Nos. 4,052,430 and 4,100,233 and in a recent article by Ichikawa et al., J. Mat. Sci. Lett. 6, 420 (1987). The polycarbosilane was yellow in appearance and was soluble in toluene, xylene, n-hexane, n-heptane, and tetrahydrofuran and was insoluble in methanol and water. The polycarbosilane contained 49.9 percent silicon, 41.9 percent carbon, 8.9 percent hydrogen, 0.73 percent oxygen, 0.8 percent Si-H, and non-detectable amounts of nitrogen, chlorine, and boron. Percent Si-H means the percentage of hydrogen directly attached to silicon. IR analysis (KBr plates with film of polycarbosilane cast from hexane solution) indicated absorptions at 740 and 830 cm$^{-1}$ (SiCH$_3$), 1020 and 1355 cm$^{-1}$ (SiCH$_2$Si), 2095 cm$^{-1}$ (SiH), 1250, 1400, 2895, and 2953 cm$^{-1}$ (CH$_3$). Molecular weight distribution was determined by gel permeation chromatography using five weight percent of the polycarbosilane in a tetrahydrofuran solution with a tetrahydrofuran elutant at a flow rate of 1.5 ml/minute and a differential refratometer detector. Molecular weight measurements were relative to a polysiloxane standard. The polycarbosilane had a number average molecular weight of 1271 and a weight average molecular weight of 3125. The molecular weight polydispersity was 2.46. The polycarbosilane had a softening temperature of 190° C.

Argon, nitrogen, hydrocarbon-free air, and nitric oxide were obtained from Scott Speciality Gases of Troy, Mich. Generally all experimental procedures were carried out under an argon or nitrogen atmosphere.

The general experimental procedures were as follows unless indicated otherwise. The preceramic polymer was first dissolved in hexane, filtered through a 0.2 micron filter, and then vacuum dried. Preceramic polymer fibers were prepared by a melt spinning technique (melt extrusion with a 10 mil spinneret) generally using a temperature in the range of 280°-320° C. under an inert atmosphere. The fibers were then placed in a curing chamber attached to a vacuum system. Generally the fibers were placed lengthwise on a Grafoil tray from Union Carbide which was fired to 1200° C. for two hours in argon before use. The access of nitric oxide to the fibers was somewhat limited because the fibers were simply lying on the tray. In a few experiments better access of the nitric oxide to the fibers was achieved (see Example 9). The curing chamber was evacuated to 0.1 torr and then backfilled with argon several times. Nitric oxide and argon were then mixed in the desired ratio before introduction into the curing chamber. The curing chamber was wrapped with heating tapes which were attached to a temperature controller. The standard temperature curing program involved heating the fibers from room temperature to 200° C. over a 24 hours period (about 7° C./hr) while exposing the fibers to the reactive gas mixture. The reactive gas flowrate was generally about 1.0 ft$^3$/hr. After the cure was complete, the fibers were converted to ceramic materials by pyrolysis to 1200° C. at a rate of about 1.0° C./min under an argon atmosphere. The following examples that the nitric oxide treatment can provide silicon carbide-containing articles with an oxygen content of less than about seven weight percent oxygen.

EXAMPLE 1

Uncured polycarbosilane fibers were prepared, cured, and pyrolyzed as described as above. The green fibers (0.104 g) were cured by exposure to 5 volume percent nitric oxide in argon while the temperature of the curing chamber was raised from ambient temperature to 200° C. over a 24 hour period. After pyrolysis, black lustrous ceramic fibers were obtained (0.077 g, 73 percent char yield). There was no evidence of melting or fusing of the fibers during pyrolysis. The ceramic fibers contained 38.5 percent carbon, 2.5 percent oxygen, 0.01 percent hydrogen, and 0.08 percent nitrogen. The ceramic fibers had an average tensile strength of 249±121 Ksi, an average modulus strength of 27.8±13.7 Msi, and an average diameter of 12.2±2.3 microns. (Ksi is 1000 pounds per square inch; Msi is 1,000,000 pounds per square inch.) The following electrical properties of the ceramic fibers were determined: volume resistivity equaled 15.5 Ohm-cm at 30° C.; dielectric constant equaled 30.4 at 8.9 GHz; and the loss factor equaled 4.4 at 8.9 GHz. The density of the ceramic fibers was 2.572 g/ml.

EXAMPLE 2

This example is a duplicate of Example 1. Green fibers (0.126 g) were cured by exposure to 5 volume percent nitric oxide in argon. After pyrolysis to 1200° C., black lustrous ceramic fibers were obtained (0.093 g, 74 percent char yield). There was no evidence of melting or fusing of the fibers during pyrolysis. The ceramic fibers contained 37.0 percent carbon, 4.0 percent oxygen, and 0.01 percent nitrogen. The ceramic fibers had an average tensile strength of 286±72 Ksi, an average modulus strength of 24.2±4.2 Msi, and an average diameter of 7.2±0.7 microns.

EXAMPLE 3

Ceramic fibers were prepared as in Example 1 except that the green fibers (0.193 g) were cured by exposure to 9 volume percent nitric oxide in argon. After pyrolysis to 1200° C., black lustrous ceramic fibers were obtained (0.152 g, 79 percent char yield). There was no evidence of melting or fusing of the fibers during pyrolysis. The ceramic fibers contained 35.9 percent carbon, 4.9 percent oxygen, 0.19 percent hydrogen, and 0.19 percent nitrogen. The ceramic fibers had an average tensile strength of 249±80 Ksi, an average modulus strenght of 25.2±7.8 Msi, and an average diameter of 11.4±1.8 microns. The following electrical properties of the ceramic fibers were determined: volume resistivity equaled 70.8 Ohm-cm at 30° C.; dielectic constant equaled 15.4 at 8.9 GHz; and the loss factor equaled 7.4 at 8.9 GHz. The density of the ceramic fibers was 2.574 g/ml.

EXAMPLE 4

Ceramic fibers were prepared as in Example 1 except that (1) the green fibers (0.162 g) were cured by exposure to 9 volume percent nitric oxide in argon and (2) the flowrate of the nitric oxide/argon mixture over the fibers was increased to 2.0 ft$^3$/hr. After pyrolysis to 1200° C., black lustrous ceramic fibers were obtained (0.132 g, 80 percent char yield). There was no evidence of melting or fusing of the fibers during pyrolysis. The ceramic fibers contained 34.9 percent carbon, 4.5 percent oxygen, 0.04 percent hydrogen, and 0.07 percent nitrogen. The ceramic fibers had an average tensile strength of 274±97 Ksi, an average modulus strength of 30.7±7.9 Msi, and an average diameter of 8.8±1.1 microns.

EXAMPLE 5

Ceramic fibers were prepared as in Example 1 except that (1) the green fibers (0.094 g) were cured by exposure to nitric oxide vapor without any argon dilution and (2) the cure temperature was raised from ambient temperature to 200° C. in 2 hours. After pyrolysis to 1200° C., black lustrous ceramic fibers were obtained (0.067 g, 72 percent char yield). There was no evidence of melting or fusing of the fibers during pyrolysis. The ceramic fibers contained 36.1 percent carbon, 3.9 percent oxygen, 0.03 percent hydrogen, and 0.06 percent nitrogen. The ceramic fibers had an average tensile strength of 108±42 Ksi, an average modulus strength of 18.9±4.5 Msi, and an average diameter of 14.5±1.8 microns.

EXAMPLE 6

This example, demonstrating air curing, is included for comparison purposes only. Ceramic fibers were prepared as in Example 1 except that the green fibers (0.121 g) were cured by exposure to 9 volume percent air (hydrocarbon-free) in argon. After pyrolysis to 1200° C., black lustrous ceramic fibers were obtained (0.101 g, 80 percent char yield). There was no evidence of melting or fusing of the fibers during pyrolysis. The ceramic fibers contained 33.0 percent carbon, 8.1 percent oxygen, 0.03 percent hydrogen, and 0.04 percent nitrogen. The ceramic fibers had an average tensile strength of 262±50 Ksi, an average modulus strength of 29.5±2.8 Msi, and an average diameter of 9.3±0.5 microns. The procedures used are essentially equivalent to the procedures used to prepare Nicalon ceramic fibers by Nippon Carbon Co. [See, for example, Ichikawa, et al., J. Mat. Sci. Lett., 6, 420 (1987).] A comparison of Examples 1-5 with the present Example 6 shows that the ceramic fibers produced from polycarbosilane cured by nitric oxide contain significantly less oxygen than comparable air cured ceramic fibers. Commercial Nicalon ceramic fibers from Nippon Carbon Co. generally contain 10-12 percent oxygen.

EXAMPLE 7

This example demonstrates the thermal stability of nitric oxide cured ceramic fibers. The ceramic fibers of Example 2 were heated under an argon atmosphere from ambient temperature to 1400° C., held at 1400° C. for four hours, and then heated to 1570° C. and held for an additional two hours in the Lindberg furnace. The total mass loss from 1200° to 1570° C. for nitric oxide cured ceramic fibers was about 7.4 weight percent.

Commercial Nicalon fibers, when subjected to a similar thermal treatment to 1570° C., lost about 20 weight percent in the temperature range 1200° to 1570° C. Commercial Nicalon fibers are similar to the air cured fibers of Example 6. Such air cured fibers contain significantly more oxygen than polycarbosilane-derived fibers prepared from the practice of this invention.

EXAMPLE 8

Ceramic fibers were prepared as in Example 1 except that the green fibers (0.093 g) were cured by exposure to 50 volume percent nitric oxide in argon. After pyrolysis to 1200° C., black lustrous ceramic fibers were obtained (0.074 g, 80 percent char yield). There was no evidence of melting or fusing of the fibers during pyrolysis. The ceramic fibers contained 33.8 percent carbon, 9.2 percent oxygen, 0.08 percent hydrogen, and 0.07 percent nitrogen. The ceramic fibers had an average tensile strength of 266±52 Ksi, an average modulus strength of 27.9±3.7 Msi, and an average diameter of 10.9±0.3 microns.

EXAMPLE 9

Ceramic fibers were prepared as in Example 3 except that during the nitric oxide cure the green fibers (0.140 g) were kept under tension by stretching them over ceramic blocks such that the middle portions (lengthwise) were unsupported and thus fully exposed to the nitric oxide gas in all directions. After pyrolysis to 1200° C., black lustrous ceramic fibers were obtained (0.100 g, 71 percent char yield). There was no evidence of melting or fusing of the fibers during pyrolysis. The ceramic fibers contained 36.9 percent carbon, 4.0 percent oxygen, and 0.04 percent nitrogen. The ceramic fibers had an average tensile strength of 405±66 Ksi, an average modulus strength of 27.5±4.1 Msi, and an average diameter of 6.9±0.5 microns. The following electrical properties of the ceramic fibers were determined: volume resistivity equaled 16.6 Ohm-cm at 30° C.; dielectic constant equaled 22.7 at 8.9 GHz; and the loss factor equaled 18.5 at 8.9 GHz. The density of the ceramic fibers was 2.592 g/ml.

Duplicate nitric oxide cured ceramic fibers were prepared in exactly the same manner in a separate experiment. The ceramic fibers contained 35.9 percent carbon, 3.5 percent oxygen, 0.04 percent hydrogen, and 0.08 percent nitrogen. The ceramic fibers had an average tensile strength of 388±79 Ksi, an average modulus strength of 27.2±7.1 Msi, and an average diameter of 7.8±0.9 microns.

For comparison purposes, a commercially available sample of Nicalon ceramic fiber for Nippon Carbon Co. contained 11.5 weight percent oxygen and had an average tensile strength of 397±43 Ksi, an average modulus strength of 30.7±3.7 Msi, and an average diameter of 16.6±1.7 microns. The ceramic fibers obtained by the practice of this invention have essentially equivalent tensile and modulus strengths as commercial Nicalon fiber but with significantly reduced oxygen content.

EXAMPLE 10

Ceramic fibers were prepared as in Example 3 except that a hydriosilazane polymer was employed. The hydridosilazane polymer was prepared using the technique of U.S. Pat. No. 4,450,803. The polymer had a softening temperature of 58° C. contained 46.4 percent silicon, 22.0 percent carbon, 8.5 percent hydrogen, and 0.98 percent Si-H, and had a weight average molecular weight of 10,793, a number average molecular weight of 2,459, and a molecular weight polydispersity of 4.39. Fibers were melt spun at a temperature of 150° C. During the nitric oxide cure the green hydridopolysilazane fibers (0.087 g) were kept under tension by stretching them over ceramic blocks as in Example 9. After pyrolysis to 1200° C., brownish black ceramic fibers were obtained (0.047 g, 71 percent char yield). There was no evidence of melting or fusing of the fibers during pyrolysis. The ceramic fibers contained 9.86 percent carbon, 13.4 percent oxygen, and 15.61 percent nitrogen. The ceramic fibers had an average tensile strength of 115±52 Ksi, an average modulus strength of 10.6±5.7 Msi, and an average diameter of 8.5±0.2 microns.

That which is claimed:

1. A method of rendering a preceramic polycarbosilane infusible prior to pyrolysis, which method comprises treating the preceramic polycarbosilane with gaseous nitric oxide for a time sufficient to render the preceramic polycarbosilane infusible, wherein a ceramic material prepared from the infusible preceramic polycarbosilane contains less than about seven weight percent oxygen.

2. A method as defined in claim 1 where the polycarbosilane is prepared by thermally decomposing and polycondensing a polysilane or polysilanes by heating said polysilane or polysilanes at a temperature of 300°–2000° C. in an inert gas, hydrogen, or vacuum wherein said polysilane or polysilanes are selected from the group consisting of cyclic polysilanes of the general formula

(R$^1$R$^2$Si)$_n$ and linear polysilanes of the general formula

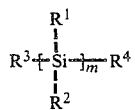

where n is greater than or equal to 4; where m is greater than or equal to 2; and where R$^1$, R$^2$, R$^3$, and R$^4$ are independently selected from the group consisting of hydrogen, alkyl groups containing 1 to 4 carbon atoms, phenyl, —Si(R$^5$)$_3$ groups where R$^5$ is a alkyl group containing 1 to 4 carbon atoms, and halogen atoms.

3. A method as defined in claim 1 where the polycarbosilane is in the form of a fiber and where the gaseous nitric oxide is in the form of a nitric oxide/inert gas mixture.

4. A method as defined in claim 3 where the temperature at which the polycarbosilane fiber is treated with nitric oxide is slowly increased to about 200° C.

5. A method as defined in claim 4 where the nitric oxide/inert gas mixture contains about 4 to 10 volume percent nitric oxide.

6. A method as defined in claim 5 where the temperature at which the polycarbosilane fiber is treated with nitric oxide is slowly increased to about 200° C. at a rate of about 5° to 10° C./hr.

7. A method as defined in claim 3 where the polycarbosilane fiber is under tension during the nitric oxide treatment.

8. A method as defined in claim 4 where the polycarbosilane fiber is under tension during the nitric oxide treatment.

9. A method as defined in claim 5 where the polycarbosilane fiber is under tension during the nitric oxide treatment.

10. A method as defined in claim 6 where the polycarbosilane fiber is under tension during the nitric oxide treatment.

11. A method of preparing a silicon carbide-containing ceramic article with a low oxygen content, said method comprising (A) forming an article of the desired shape from a preceramic polycarbosilane; (B) curing the article formed in step (A) by heating the formed article under a nitric oxide-containing atmosphere to about 200° C. at a rate sufficiently slow so that the formed article will not melt or fuse during pyrolysis step (C); and (C) heating the cured article of step (B) in an inert atmosphere or in a vacuum to an elevated temperature greater than 800° C. until the preceramic polymer is converted to a silicon carbide-containing ceramic article with less than about seven weight percent oxygen.

12. A method as defined in claim 11 where the polycarbosilane is prepared by thermally decomposing and polycondensing a polysilane or polysilanes by heating said polysilane or polysilanes at a temperature of 300°–2000° C. in an inert gas, hydrogen, or vacuum wherein said polysilane or polysilanes are selected from the group consisting of cyclic polysilanes of the general formula

(R$^1$R$^2$Si)$_n$ and linear polysilanes of the general formula

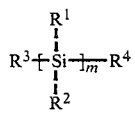

where n is greater than or equal to 4; where m is greater than or equal to 2; and where R$^1$, R$^2$, R$^3$, and R$^4$ are independently selected from the group consisting of hydrogen, alkyl groups containing 1 to 4 carbon atoms, phenyl, —Si(R$^5$)$_3$ groups where R$^5$ is a alkyl group containing 1 to 4 carbon atoms, and halogen atoms.

13. A method as defined in claim 12 where the article formed is a fiber.

14. A method as defined in claim 13 where the nitric oxide-containing atmosphere is a nitric oxide/inert gas mixture containing about 4 to 10 volume percent nitric oxide.

15. A method as defined in claim 14 where the rate in the curing step (B) is about 5° to 10° C./hr.

16. A method as defined in claim 13 where the fiber is under tension during the curing step (B).

17. A method as defined in claim 14 where the fiber is under tension during the curing step (B).

18. A method as defined in claim 15 where the fiber is under tension during the curing step (B).

* * * * *